Apr. 10, 1923.

H. R. LONTZ 1,451,429

METHOD OF MAKING RESILIENT BEARING SLEEVES

Original Filed Aug. 22, 1919

Harry R Lontz  INVENTOR.

BY

Mauro Cameron, Lewis & Kerkam
ATTORNEYS.

Patented Apr. 10, 1923.

1,451,429

UNITED STATES PATENT OFFICE.

HARRY R. LONTZ, OF RICHMOND, INDIANA.

METHOD OF MAKING RESILIENT BEARING SLEEVES.

Original application filed August 22, 1919, Serial No. 319,223. Divided and this application filed January 12, 1921. Serial No. 436,759.

*To all whom it may concern:*

Be it known that I, HARRY R. LONTZ, a citizen of the United States of America, and a resident of Richmond, Indiana, have invented an Improved Method of Making Resilient Bearing Sleeves, which invention is fully set forth in the following specification.

This invention relates to the method of making resilient bearing sleeves, and this application is a division of my application Sr. No. 319,223, filed August 22, 1919.

It has heretofore been proposed, as in the patent of Brown, No. 1,031,417, granted July 2, 1912, wherein the invention is illustrated as embodied in a bearing for the rotary cutter blades of a lawn-mower, to provide a bearing with a resilient bearing sleeve which, under the influence of a spring, will coact with the bearing members to take up any slack therebetween but which will grip the shaft or other supporting member, when a proper bearing pressure has been obtained, to prevent the force of the spring from being exerted on the bearing itself. Resilient bearing sleeves of this type must be made of the proper size within very close limits and, to avoid the expense and labor of machining to substantially mathematical exactness, it has been proposed to make these sleeves of die castings. This manner of manufacture, however, has necessitated the use of a metal which lends itself to die-casting, and it has been found exceedingly difficult, if not impossible, to produce a resilient bearing sleeve by this method which is both sufficiently resilient to perform its intended function and sufficiently tough and strong to withstand breakage during assemblinig and the exigencies of use.

It is an object of this invention to provide a bearing sleeve which is both sufficiently resilient and strong and durable, and which can be manufactured with a minimum expenditure of time and labor.

A further object of the invention is to provide a resilient bearing sleeve of sheet metal, preferably steel, by stamping or pressing the same up in a simple and efficient manner.

Yet another object of the invention is to provide a resilient bearing sleeve that is both lighter and stronger than has been produced by methods heretofore in use.

A still further object of the invention is to provide a method of making a resilient bearing sleeve whereby a sleeve suitable for assembly in the bearing structure may be produced by stamping operations only and whereby but a minimum of stamping operations are employed.

The invention is capable of receiving a variety of expressions, one of which is illustrated on the accompanying drawings, but it is to be expressly understood that the drawings are for purposes of illustration only and are not to be construed as a definition of the limits of the invention, reference being had to the appended claims for that purpose.

In said drawings:—

In accordance with the present invention, the resilient bearing sleeve is pressed up from sheet metal which, within the broader aspects of this invention, the sleeve may be stamped or pressed up in any suitable way, but the preferred procedure, and one which constitutes a part of the present invention, is as follows:—

Figure 1:
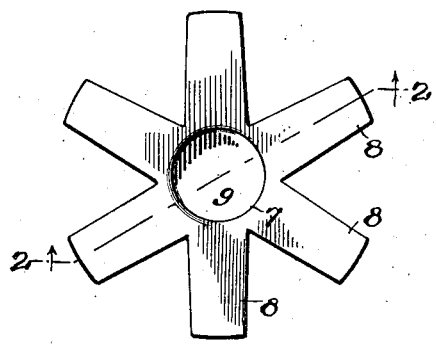
Fig. 1 is a plan view of the "rough" blank from which the sleeve is to be pressed up.
Figure 2:
Fig. 2 is a section on line 2—2 of Fig. 1.

A rough blank is first cut from a sheet of metal of suitable thickness to secure the desired strength and resiliency, such blank comprising, as shown in Fig. 1, a central circular portion 7 and a plurality, six being shown, of radial arms 8. Simultaneously with this cutting operation, or subsequently as a separate step if desired, the central portion of the blank is drawn down into a hub-like depression, as shown at 9 in Fig. 2, the inner diameter of the depression being substantially that of the shaft or other support on which the sleeve is to be mounted in the completed bearing.

Figure 3:
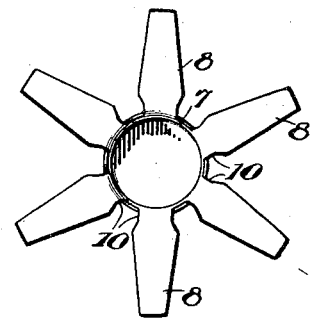
Fig. 3 is a plan view of the trimmed blank.

The rough blank is then subjected to a finishing out by which, as shown in Fig. 3, the arms are given a sligtly tapered formation and are cut away adjacent where they join the hub-like depression 9 to form reduced neck-portions 10. Under some circumstances the roughing cut may be omitted and the blank cut from the sheet of metal in the finished form shown in Fig. 3; the procedure outlined, however, is preferred.

Figure 4:
Fig. 4 is a cross-section between two of the radial arms showing the blank after the first forming operation.

The blank is next subjected to a forming operation whereby the reduced neck-portions 10 are bent back upon themselves along lines intermediate of their length, as shown in Fig. 4, whereby the body portions of the radial arms are bent at a small angle to a plane right-angularly disposed to the axis of the hub-like depression 9, as also clearly shown in Fig. 4. In order to prevent the arms from buckling in the operation of the bearing, it is desirable to strengthen both their body portions and their necks. This may be done by pressing a rib into the body portion of each arm, as shown at 11 in Fig. 6, and a corresponding rib into each neck, as shown at 12 in the same figure. While these reinforcing ribs may be pressed into the radial arms at any suitable stage in the manufacture of the sleeves, it is preferred to form the ribs at the same time that the forming operation above described is performed.

Figure 5:
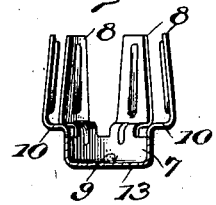
Fig. 5 is a cross-section of the blank after the second forming operation.
Figure 6:
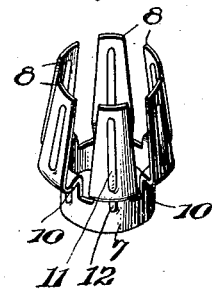
Fig. 6 is a perspective view of the finished sleeve.
Figure 7:
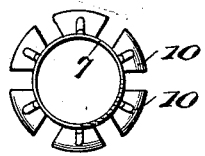
Figs. 7 and 8 are respectively bottom and top plan views of the finished sleeve.
Figure 8:
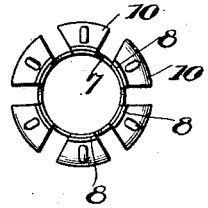

The blank is next subjected to a forming operation whereby the portions of the necks 10 which have been bent over are brought into a plane at substantially a right-angle to the axis of the hub-like depression 9, as shown in Fig. 5. This bending operation also brings the body portions of the radial arms to a position inclined at a small angle to the axis of the hub, as also clearly shown in Fig. 5. The bottom 13 of the depression 9 is then cut out to complete the hub, and the sleeve is subjected to a final forming operation whereby the resilient arms 8 are brought into their final axially-inclined positions, as shown in Fig. 6, the diameter of the opening formed by the free ends of said arms being slightly in excess of the diameter of the shaft or other support on which the sleeve is to be mounted.

The sleeve may thus be formed to substantially exact size without any machining operation, and possesses sufficient resiliency so that, when assembled in a bearing of the type described and illustrated in the patent to Brown above referred to, it will perform its function with maximum efficiency. At the same time the sleeve possesses sufficient strength to prevent breakage during assembly and subsequent use and is lighter than sleeves produced by methods heretofore suggested.

While a preferred manner of making the resilient bearing sleeve of this invention has thus been set forth in detail, it is to be understood that, as respects the broader features thereof, the invention is not limited to use of the method described, as the sleeve may be made in any suitable way. Changes may also be made in the details of procedure of the method outlined without departing from the spirit of my invention, while the cutting and forming operations may be carried out by any suitable means. Reference is therefore to be had to the claims hereto appended for a definition of the limits of this invention.

What is claimed is:—

1. The method of making a resilient bearing sleeve which comprises cutting a blank with radial arms, forming a hub-like part at the center of said blank, bending back portions of said arms at their junction with the hub-like part and bending the remaining arm portions at an angle to the bent back arm portions, and re-bending the bent back arm portions to bring the arms into the form of a sleeve.

2. The method of making a resilient bearing sleeve which comprises cutting a blank with radial arms, forming a hub-like part at the center of said blank, bending back portions of said arms at their junction with the hub-like part and bending the remaining arm portions at an angle to the bent back arm portions, and re-bending the bent back arm portions to incline the remaining arm portions toward the axis of the hub-like part.

3. The method of making a resilient bearing sleeve which comprises cutting a blank with radial arms, forming a hub-like depression at the center of said blank, bending back portions of said arms at their junction with the hub-like depression and bending the remaining arm portions at an angle to the bent back arm portions, re-bending the bent back arm portions to bring the arms into the form of a sleeve, cutting out the bottom of said depression to form a hub, and inclining the free end portions of said arms toward the axis of said hub.

4. The method of making a resilient bearing sleeve which comprises cutting a blank with radial arms, reducing the width of the arms adjacent their junction with the central portion of the blank, bending back the reduced portions and bending the body portions of the arms at an angle to said reduced portions, and bending said reduced portions to bring the body portions of said arms into the form of a sleeve.

5. The method of making a resilient bearing sleeve which comprises cutting a blank with radial arms, forming a hub part at the center of said blank, bending back the inner arm portions at their junction with the hub part and bending the outer portions of said arms at an angle to the bent back inner portions, reinforcing said arms by pressing ribs therein, and re-bending the inner arm portions to incline the outer arm portions toward the axis of said hub part.

6. The method of making a resilient bearing sleeve which comprises cutting a blank with radial arms, forming a hub-like depression at the center of the blank, reducing the width of the arms adjacent their junction with the hub-like depression, bending back the reduced portions and bending the body portions of the arms at an angle to said reduced portions, and bending said reduced portions to bring the body portions of said arms into the form of a sleeve.

7. The method of making a resilient bearing sleeve which comprises cutting a blank with radial arms, forming a hub-like depression at the center of the blank, reducing the width of the arms adjacent their junction with the hub-like depression, bending the reduced portions back upon the hub-like depression and bending the body portions of the arms at an angle to said reduced portions, and bending the bent reduced portions into a plane at substantially a right-angle to the axis of said hub-like depression to bring the body portions of said arms into the form of a sleeve.

8. The method of making a resilient bearing sleeve which comprises cutting a blank with radial arms, forming a hub-like depression at the center of the blank, reducing the width of the arms adjacent their junction with said hub-like depression, bending said reduced portions back upon themselves along lines intermediate of their length and simultaneously bending the body portions of said arms at an angle to said reduced portions, and bending the bent reduced portions into a plane at substantially a right-angle to the axis of said hub-like depression to bring the body portions of said arms into the form of a sleeve.

9. The method of making a resilient bearing sleeve which comprises cutting a blank with radial arms, reducing the width of said arms adjacent their junction with the central portion of the blank, reinforcing said arms by pressing ribs into the body portions thereof and into said reduced portions, and bending said arms into the form of a sleeve.

In testimony whereof I have signed this specification.

HARRY R. LONTZ.